(12) United States Patent
Perales-Perez et al.

(10) Patent No.: US 10,035,714 B1
(45) Date of Patent: Jul. 31, 2018

(54) PHOTOCATALYTIC ACTIVITY OF QUANTUM DOTS-MAGNETITE NANOCOMPOSITE TO DEGRADE ORGANIC DYES IN AQUEOUS PHASE

(71) Applicants: Oscar Juan Perales-Perez, Mayaguez, PR (US); Felix Roberto Roman-Velasquez, Mayaguez, PR (US); Sonia Janet Bailon-Ruiz, Mayaguez, PR (US); Luis Alberto Alamo-Nole, Mayaguez, PR (US)

(72) Inventors: Oscar Juan Perales-Perez, Mayaguez, PR (US); Felix Roberto Roman-Velasquez, Mayaguez, PR (US); Sonia Janet Bailon-Ruiz, Mayaguez, PR (US); Luis Alberto Alamo-Nole, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 14/192,786

(22) Filed: Feb. 27, 2014

(51) Int. Cl.
| | | |
|---|---|---|
| *C02F 1/32* | (2006.01) | |
| *B01J 31/26* | (2006.01) | |
| *C02F 1/48* | (2006.01) | |
| *C02F 1/74* | (2006.01) | |
| *B82B 1/00* | (2006.01) | |
| *A61K 49/18* | (2006.01) | |
| *C09K 11/88* | (2006.01) | |
| *A62D 101/26* | (2007.01) | |
| *C02F 101/30* | (2006.01) | |

(52) U.S. Cl.
CPC .............. *C02F 1/32* (2013.01); *B01J 31/26* (2013.01); *C02F 1/488* (2013.01); *C02F 1/74* (2013.01); *A62D 2101/26* (2013.01); *B01J 2231/005* (2013.01); *B01J 2531/27* (2013.01); *B01J 2531/842* (2013.01); *C02F 2101/308* (2013.01); *C02F 2305/10* (2013.01)

(58) Field of Classification Search
None
See application file for complete search history.

(56) References Cited

PUBLICATIONS

Alamo-Nole, L., et al. Photocatalytic activity of quantum dot-magnetite nanocomposites to degrade organic dyes in the aqueous phase. J. Mater. Chem. A, 2013, 1, 5509-5516.*
Wang, D. CDSE Quantum Dots and Luminescent/Magnetic Particles for Biological Applications. University of New Orleans Theses and Dissertations. 2005. Paper 142.*
(Continued)

*Primary Examiner* — Krishnan S Menon
*Assistant Examiner* — Ryan B Huang
(74) *Attorney, Agent, or Firm* — Hoglund & Pamias, PSC; Roberto J. Rios (57) ABSTRACT

Quantum dots of Cd (Se,S) and fluorescent magnetic nanocomposites (Cd (Se,S)-Magnetite) were used as photocatalyst agent in the photodegradation of methylene blue (MB) under UV irradiation at pH 6.5. A degradation of 99.1% and 90.0% of MB was achieved in presence of 160 mg/L-quantum dots and magnetic nanocomposite, respectively, after 4.5 hours of UV-irradiation. Instead, 45.9% and 100% of MB degradation was achieved using 160 mg/L of $TiO_2$ anatase and aeroxide P25, respectively. The reuse of the magnetic nanocomposites allowed a maximum photo-degradation capacity of 65%.

15 Claims, 5 Drawing Sheets

(56) References Cited

PUBLICATIONS

Lopez-Gallego, F., et al. Enzyme stabilization by glutaraldehyde crosslinking of adsorbed proteins on aminated supports. J. Biotechnol. 119, 2005, 70-75.*

Luna-Pineda, T., et al. Synthesis and characterization of alginate based-magnetic nanocomposites. NSTI-NAnotech 2009, vol. 2, 2009, 495-498.*

Alamo-Nole, L., et al. Preparative size-exclusion chromatography for separation and purification of water-stable Cd-based quantum dots. Anal. Methods, 2012, 4, 3127-3132.*

* cited by examiner

PHOTOCATALYTIC ACTIVITY OF QUANTUM DOTS-MAGNETITE NANOCOMPOSITE TO DEGRADE ORGANIC DYES IN AQUEOUS PHASE

GOVERNMENT INTEREST

The claimed invention was made with U.S. Government support under grant number HRD 0833112 awarded by The National Science Foundation (NSF). The government has certain rights in this invention.

BACKGROUND OF THE INVENTION

Environmental problems are frequently related to waste and toxic organic pollutants discharged in water bodies. Most of the colored effluents found in contaminated waters consist of organic dyes from textiles, dyestuff and dyeing industries. Sulfonated azo dyes and phenazine dyes are the most common compounds used in fabric factories. Conventional waste water treatments like flocculation, activated carbon adsorption and bioremediation have been shown to be ineffective in the remediation of organic dyes mainly because of the high solubility of these contaminants in water, besides, these processes produce large quantities of sludge. Therefore, photocatalysis can be considered an attractive alternative route to degrade and destroy contaminants. Some advantages of the photocatalytic approach include a quick oxidation of the pollutant molecules, lack of production of polycyclic products and final degradation of pollutants in the ppb range.

The photo-catalytic destruction of organic dyes is a process that combines catalysis with solar radiation-based technologies. In this regard, semiconductors quantum dots (QDs) absorb light of energy more than or equal to its band-gap, a process that generates electron and holes, and further free-radicals that can be used to oxidize the contaminants.

Quantum dots exhibit higher surface-area to volume ratio than their bulk counterparts and thus allow for greater photon absorption on the photocatalyst surface. Also, the higher band gap energy observed in quantum dots in comparison to the bulk produces a higher redox potential in the system. Previous studies have synthesized Cd-based and Zn-based QDs with photocatalytic properties for the degradation of organic pollutants under UV light irradiation; however, the main limitation in these works has been the recovery of these nanomaterials after the expected photo-catalytic reactions have taken place. The small size of nanoparticles avoids their recovery by the use of traditional techniques such as precipitation, centrifugation among others, so that, the use and reuse of these materials in high volumes of contaminated water is not a viable process.

On the other hand, bi-functional nanostructures provide the possibility to obtain materials with photocatalytic and magnetic properties, which can facilitate their recuperation and posterior reuse. Fluorescent magnetic nanocomposites based on $Fe_2O_3$ and CdTe have been synthesized by Yan et al. (included herein by reference), however, their photocatalytic properties were not studied.

SUMMARY OF THE INVENTION

This invention provides the production of a fluorescent magnetic nanocomposite synthesized by a ligand-exchange method and the evaluation of its photocatalytic properties to degrade methylene blue in aqueous phase. The potential re-use of the fluorescent magnetic nanocomposite, after its recovery by using an external magnetic field, is also a novel contribution. Nanocomposites were synthesized from Cd(Se,S) quantum dots and $Fe_3O_4$ nanostructures. The optical properties of the QDs allow the photodegradation of the methylene blue whereas the magnetic properties of magnetite will facilitate an easy recovery and reuse of the nanocomposite. Titanium dioxide (anatase and aeroxide P25 forms), a known photocatalyst agent, was used as comparison purposes. X-ray Diffraction, Fourier Transform Infrared (FT-IR), UV-Vis and Photoluminescence spectroscopy techniques were used to characterize the nanocomposite on structurally and optically basis. A HPLC system equipped with a diode array (DAD) and a Mass Spectrometry (MS) detector was used to study the photo-degradation of the dye and identify the corresponding degradation products.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Materials and Methods
Chemicals

Ferric chloride hexahydrate 97%, ferrous chloride tetrahydrate 99%, and sodium hydroxide 98% were purchased from Alfa Aesar. Sodium oleate 98% was supplied by CTI. Dimethylsulfoxide, meso-2,3-Dimercaptosuccinic Acid (DMSA 98%), ethanol 98%, toluene 99.5%, acetone 99.6%, were provided by Fisher Scientific. Selenium powder 99.99% trace metals basis, sodium bisulfite>98%, cadmium sulfate>98.0%, thioglycolic acid (TGA, ≥98%) and 25% glutaraldehyde were purchased from Sigma-Aldrich. Titanium dioxide ($TiO_2$) (anatase 99%) with an average particle size of 10-30 nm and reactive surface area of 210±10 $m^2/g$ purchased from Nanostructured and Amorphous Materials Inc., was used as-received for all degradation experiments. Titanium dioxide (aeroxide P25, "Degussa") with an average particle size of 21 nm and a surface area of 35-65 $m^2/g$ was provided from Sigma-Aldrich.

Synthesis of the Magnetite Nanocomposite

Bare magnetite was produced using a modified co-precipitation method (Synthesis and Characterization of Alginate-Based Magnetic Nanocomposite, T. Luna-Pineda, O. Perales-Pérez and F. Roman-Velazquez, Nanotech, 2009, 2, 495-498, incorporated herein by reference). Briefly, a sodium hydroxide solution was heated up to boiling point (100° C.) and stirred at 500 rpm. The iron solution was added to the alkaline solution when it reached the boiling temperature. After one hour of reaction time, a 0.06 M sodium oleate solution was added to the magnetite suspension and stirred for one additional hour. The oleate-coated magnetite nanoparticles were washed with deionized water, ethanol and acetone and ultrasonicated for 10 minutes in presence of toluene. A 0.55M solution of DMSA in dimethyl sulfoxide was added to the oleate coated magnetite and ultrasonicated for 60 minutes in order to promote the ligand-exchange and replace the oleate for the DMSA species. The excess of the organic phase was removed and the recovered DMSA-magnetite nanoparticles washed with acetone, ethanol and re-suspended in deionized water.

Cd-based QDs covered with thioglycolic acid (TGA) species were synthesized by adding fresh selenide solution to a cadmium sulfate solution at pH 7.0 in presence of TGA. The molar ratio Cd/TGA/Se was fixed at 1/4.8/0.04. The solutions were heated for 30 minutes at 140° C. using a microwave digestion system (CEM Corporation, 200 W). As-synthesized quantum dots were coagulated using 2-propanol and re-suspended in deionized water.

The synthesis of the nanocomposite was based in a ligand-exchange method. In brief, synthesized DMSA-magnetite were re-suspended in Phosphate Buffer Saline (PBS) and contacted with a 3% v/v of glutaraldehyde solution to a final concentration of 5000 mg/L. The sample was stirred for 18 hours at room temperature using a rotamix Model RKVSD unit set at 20 mg/L. Functionalized magnetite nanocrystals were recovered magnetically, washed with deionized water and re-suspended in PBS in presence of 300 mg/L quantum dots. The suspension was stirred for 18 hours using the same conditions as previously described. Nanocomposites were recovered magnetically and washed with deionized water several times prior to characterization. Nanocomposites were synthesized in triplicate.

Photocatalytic Experiments

The photocatalytic experiments were carried out by preparing methylene blue (MB) solutions at concentrations of 10 μM. The concentration of as-synthesized quantum dots ranged from 40 to 160 mg/L. Fluorescent magnetic nanocomposites containing 160 mg/L of quantum dots was used in the photodecomposition tests. An 8 watt-UV lamp (302 nm) was used as the irradiation source with a power irradiation of 10 $mWcm^{-2}$. MB in contact with quantum dots or the fluorescent magnetic nanocomposite was exposed to ultraviolet light (UV) for 30 minutes time intervals for a total irradiation of 4.5 hours. The suspensions were gently stirred at 20 rpm at room-temperature conditions. Aliquots of the photodegraded solution were quickly withdrawn for HPLC analysis. The corresponding degradation products were identified by Mass Spectrometry. The degradation of MB in presence of UV irradiation and in absence of the quantum dots or the fluorescent magnetic nanocomposite, was also determined for comparison purposes. Under the same conditions, 10 μM of MB was contacted with 160 mg/L of $TiO_2$ (anatase and aeroxide P25 forms) for comparison purpose. In addition, the adsorption of the MB onto the QDs, nanocomposite and $TiO_2$ (anatase and aeroxide P25) was evaluated. The solutions were stirred under dark conditions for 6 hours and analyzed by HPLC.

Characterization Techniques

Cd-based quantum dots, magnetite and nanocomposite previously dried in a vacuum atmosphere, were structurally characterized by X-ray diffraction (XRD) in a Siemens Powder Diffractometer D5000 using Cu-Kα radiation. A high-resolution TEM (HRTEM) study was performed on a JEM-ARM200cF operated at 200 KV. The magnetic properties were determined on a Lake shore 7400 vibrating sample magnetometer (VSM) unit with a maximum applied field of 22 kOe at room temperature. Optical absorption spectra were recorded on a Shimadtzu 1500 UV-Vis Spectrophotometer. Photoluminescence spectra were performed on a Shimadtzu RF-5301 Spectrofluorometer with 150 W Xenon lamp as the excitation source. Infrared Spectroscopy (IR) spectra were recorded using a Perkin Elmer Paragon 1000 Fourier Transform Infrared (FT-IR).

High Performance Liquid Chromatography (HPLC) from Agilent technology (Model 1200) equipped with a Diode array detector, a Bruker Squire 6000 Mass Spectrometer (MS) and eclipse XDB-C18 column (5 um) was used to study the degradation of the MB at 660 nm. The identification of the photodegradation-metabolites peaks in the chromatograms was achieved using extract ion monitoring mode in the HPLC-MS.

Results and Discussion
Structure and Characterization

Figure 1:
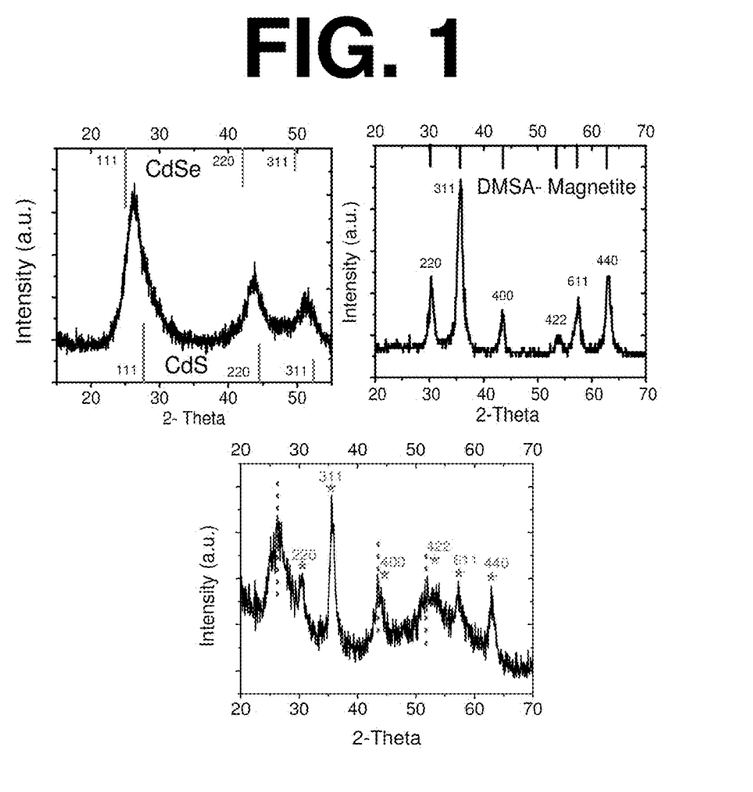
FIG. 1 shows X-Ray Diffraction patterns of Quantum Dots, DMSA-Magnetite and the Nanocomposite according to the present invention.

FIG. 1 shows the XRD patterns for Cd-based QDs (A), DMSA-magnetite (B) and the corresponding nanocomposite (C). As (A) in FIG. 1 evidences, Cd-based QDs exhibit a cubic structure of the zinc blende type. Peaks for isolated CdSe (JCPDS card19-0191) or CdS (JCPDS card 42-1411) nanocrystals were not observed, which suggested that only one type of crystalline arrangement is present in these powders. The estimation of the lattice parameter, "a," at 0.588 nm, which is in-between values for bulk CdSe (0.607 nm) and CdS (0.582 nm), suggests the formation of a solid-solution like structure of Cd(Se,S). The average crystallite size was estimated at 3.2±0.4 nm according to the Debye-Scherrer relationship. The XRD pattern of (B) in FIG. 1 (DMSA-magnetite) confirms the formation of the $Fe_3O_4$ phase in the analyzed sample. The average crystallite diameter was estimated as 9.0±1.5 nm. FIG. 1 also shows in (C) the XRD pattern corresponding to the Cd(Se,S)—$Fe_3O_4$ nanocomposite and evidences the co-existence of both crystalline phases in the sample. The (220) and (311) reflections of the quantum dots are overlapped with the (400) and (422) ones of magnetite. The nanocrystalline nature of the two phases in the nanocomposite was evidenced by HRTEM (ESI †).

Magnetization measurements for DMSA-magnetite and QDs-$Fe_3O_4$ nanocomposite reported a room temperature saturation magnetization of 44.3 emu/g and 41.9 emu/g, respectively. The decrease in the magnetization for the nanocomposite is attributed to the diamagnetic behavior of the QDs that contributes to the sample weight but not to the magnetization value (ESI †).

Figure 2:
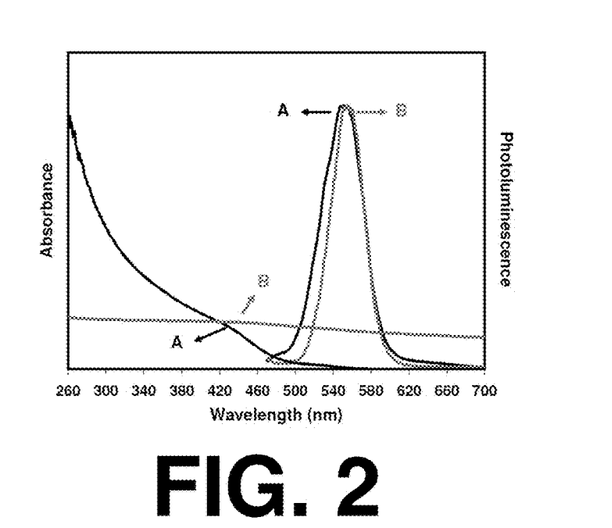
FIG. 2 shows absorption and photoluminescence spectra of quantum dots and nanocomposite according to the present invention.

Absorption and normalized emission spectra of the QDs-$Fe_3O_4$ nanocomposite are shown in FIG. 2. Cd(Se,S) QDs exhibited an absorption peak at 425 nm and an emission peak centered on 552 nm. The optical absorption of the QDs was not noticeable in the spectrum corresponding to the nanocomposite; instead, a broad band from the UV to near infrared region was observed. This broad band could be attributed to the presence of $Fe_3O_4$ which would have scattered the light. The normalized photoluminescence intensity of the nanocomposite was comparable to the QDs; only a minor red-shift in the emission peak (from 553 nm to 555 nm) was observed.

Figure 3:
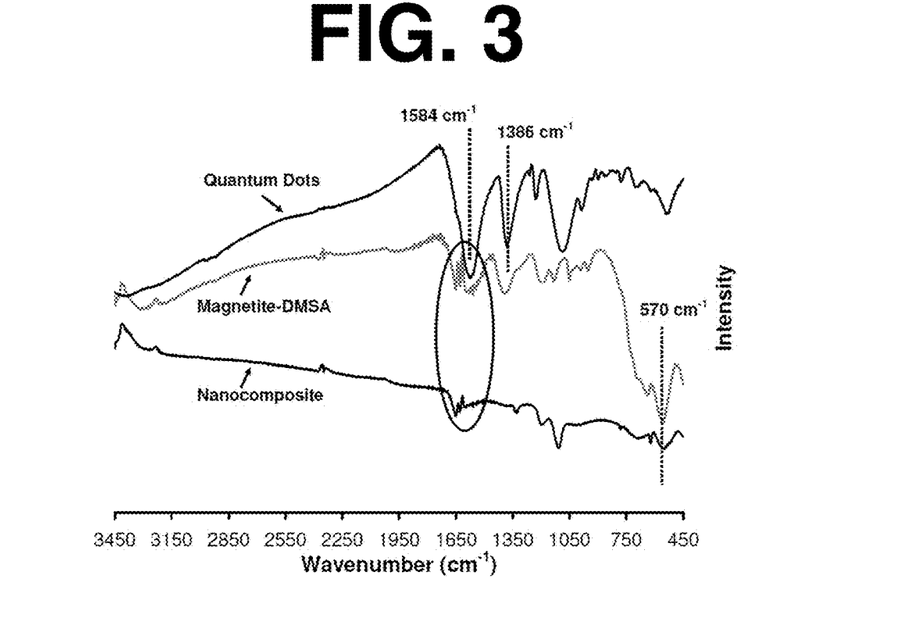
FIG. 3 shows FT-IR of quantum dots, magnetite and nanocomposite according to the present invention.

FIG. 3-(top) shows the FT-IR spectrum for Cd-based QDs. The bands at 1576 $cm^{-1}$ and 1388 $cm^{-1}$ are assigned to the asymmetric $v_{as}$ (COO—) stretch and symmetric $v_s$ (COO—) stretch in the functional groups in TGA. The presence of these bands suggests the chemisorption of TGA as carboxylate groups on the quantum dots surface. The strong band observed at 570 $cm^{-1}$ in the spectrum of DMSA—magnetite, (FIG. 3-(middle)), can be ascribed to the Fe—O tetrahedral bond. For the same spectrum, the presence of bands at 1531 $cm^{-1}$ and 1346 $cm^{-1}$ indicates the adsorption of DMSA onto the magnetite surface via the establishment of covalent bonding between surface iron and carboxylic groups in the DMSA. The presence of a band at 570 $cm^{-1}$ in the FT-IR spectrum for the nanocomposite (shown on FIG. 3-(bottom)) corresponds to the Fe—O vibration in magnetite.

Photo-Catalytic Degradation of Methylene Blue

A 10 µM solution of MB was used in all experiments. Concentrations higher than 10 µM of MB have been reported to be inadequate to photocatalytic-based processes. High concentration of MB promotes its adsorption onto the catalyst surface decreasing the number and availability of active sites and producing low quantities of hydroxyl radical species, responsible for the photo-degradation. Also, concentrated MB solutions would absorb the light needed to excite the catalyst, thus decreasing the photo-degradation efficiency. On the other hand, photocatalyc-degradation studies have been frequently carried out under alkali conditions. These studies have found that alkaline pH values favored the photo-degradation of the MB and others organic dyes. The higher availability of $OH^-$ species at such alkaline conditions should facilitate the generation of hydroxyl radicals during photo-excitation of the catalyst. In this invention, we selected a pH value of 6.5, which is commonly found in surface waters.

The wide absorption range in the Cd(Se,S) QDs enables their excitation by using light sources with wavelengths ranging from the UV to Vis regions; however, 302 nm was selected because of the maximum absorption attained at this particular wavelength. The same wavelength was used for the photodegradation experiments using $TiO_2$ (anatase and aeroxide P25 forms) for comparative purposes. The wide absorption spectra of both $TiO_2$ assures that these nanoparticles can be excited at 302 nm (ESI †).

Figure 4:
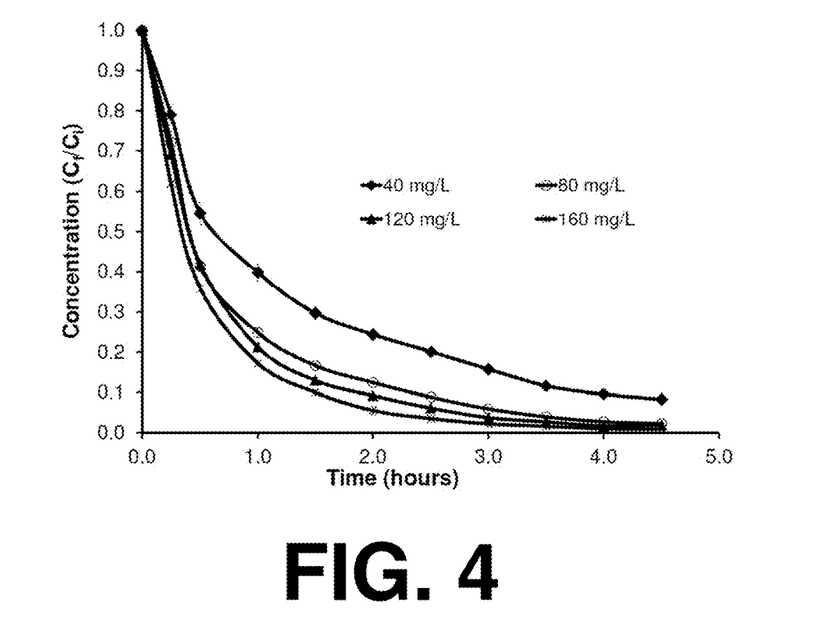
FIG. 4 shows a plot of the effect of quantum dots concentration on the Methylene Blue (10 uM) photo-degradation according to the present invention.

FIG. 4 shows the effect of the concentration of QDs on the MB degradation under UV irradiation at pH 6.5. No degradation was observed in aqueous samples containing MB only (blank tests) in presence of UV-light even after 5 hours of irradiation. Accordingly, the detected degradation was a direct consequence of the photo-excitation of the QDs. As seen, the degradation efficiency of the MB was strongly dependent on both, the QDs concentration and the time of irradiation. It was also evidenced that the higher the concentration of QDS, the faster the degradation process. After one hour of UV-irradiation, the degradation efficiency systematically varied from 62% up to 83% when the QDs concentration ranged from 40 pm to 160 mg/L, respectively. The photodegradation was almost 100% after 4.5 hours using 160 mg/L of QDs. The trends observed can be attributed to the increase of the number of active photocatalytic sites at larger quantities of nanoparticles suspended in the irradiated volume. Cd(Se,S) QDs are semiconductor nanomaterials with an onset of absorption observed in the 260-460 nm range (FIG. 2). On this basis, the light absorption of QDs should have promoted the transference of electrons from the valence band to the conduction band and the subsequent generation of an electron-hole pair. The generated holes ($h^+$) could interact with the adsorbed water onto the QDs surface to produce hydroxyl radical species that should explain the observed MB degradation. This mechanism is based on the n-dealkylation of the MB, as will be discussed later.

The photodegradation of MB by QDs of Cd(Se,S) follows a kinetic of pseudo first order, as suggested by the fitting of the experimental data to the first-order model. Table 1 below shows the comparison of the fitting parameters for both kinetic models represented by the following equations:

$$\ln[A] = K_1 t + \ln[A_O] \quad (1)$$

$$\frac{1}{[A]} = K_2 t + \frac{1}{[A_O]} \quad (2)$$

TABLE I

| Catalysts concentration | First order kinetics | | Second order kinetics | |
| --- | --- | --- | --- | --- |
| | $K_1$ | $r^2$ | $K_2$ | $r^2$ |
| QDs (40 mg/L) | 0.531 ± 0.001 | 0.975 ± 0.005 | 0.240 ± 0.009 | 0.964 ± 0.002 |
| QDs (80 mg/L) | 0.808 ± 0.007 | 0.977 ± 0.002 | 0.88 ± 0.04 | 0.885 ± 0.004 |
| QDs (120 mg/L) | 0.8894 ± 0.004 | 0.9642 ± 0.004 | 1.21 ± 0.06 | 0.896 ± 0.04 |
| QDs (160 mg/L) | 1.014 ± 0.008 | 0.961 ± 0.009 | 2.18 ± 0.08 | 0.900 ± 0.007 |
| Nanocomposite (160 mg/L) | 0.37 ± 0.01 | 0.85 ± 0.04 | 0.17 ± 0.02 | 0.96 ± 0.02 |
| Nanocomposite * (160 mg/L) | 0.15 ± 0.01 | 0.96 ± 0.03 | 0.029 ± 0.001 | 0.975 ± 0.004 |
| Nanocomposite ** (160 mg/L) | 0.15 ± 0.02 | 0.97 ± 0.01 | 0.029 ± 0.006 | 0.994 ± 0.003 |
| $TiO_2$ anatase (160 mg/L) | 0.073 ± 0.003 | 0.70 ± 0.04 | 0.0091 ± 0.0004 | 0.77 ± 0.04 |
| $TiO_2$ aeroxide P25 (160 mg/L) | 0.99 ± 0.1 | 0.95 ± 0.02 | 1.55 ± 0.04 | 0.98 ± 0.01 |

* $1^{st}$ reuse;
** $2^{nd}$ reuse

The increase of the specific rate constant K with the QD concentration confirms that the rate of the photodegradation is promoted at high QDs concentrations.

Figure 5:
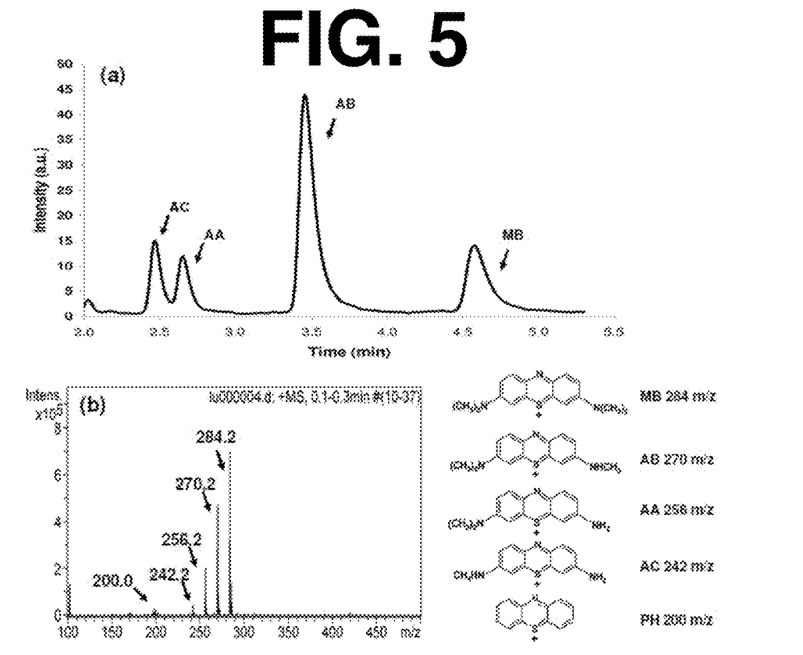
FIG. 5 shows a HPLC chromatogram of the photo-degradation of Methylene Blue (10 uM) monitored at 660 nm and the direct ESI mass spectrum of the mixture of degradation products according to the present invention.

It is considered that the photodegradation of the MB would undergo through the n-dealkylation of the aliphatic tertiary amine. The loss of the first methyl group of the MB would be conducive to the formation of azure B. In our case, the presence of the azure B (AB) in solution was confirmed by MS and the corresponding spectra are shown in FIG. 5-(b); Azure B with a 270.2 m/z was the main product of the photodegradation. In turn, the AB peak appeared at a retention time of 3.5 minutes in the chromatogram shown in FIG. 5-(a). The other two peaks associated to different photodegradation by-products were detected at retention times of 2.7 minutes and 2.5 minutes and assigned to Azure A (AA) and Azure C (AC), respectively. They were produced after the secondary n-dealkylations of the AB. Moreover, the presence of AA (256.2 m/z) and AC (242.2 m/z) was confirmed by the MS analyses of FIG. 5-(b).

Figure 6:
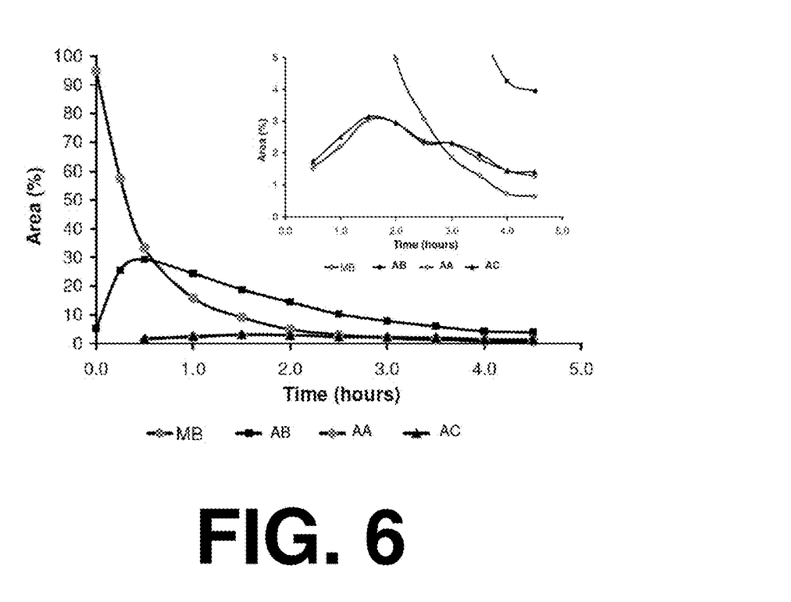
FIG. 6 shows plots for the monitoring of degradation products of Methylene Blue (10 uM) catalyzed by quantum dots according to the present invention.

FIG. 6 shows the percent area of the MB (10 μM of initial concentration) and the corresponding photodegradation by-products (AB, AA and AC) after 4.5 hours of 302 nm-UV irradiation in presence of 160 mg/L-QDs. As seen, the MB concentration decreased exponentially. The concentration of azure B increased during the first half hour; at this point, the azure B is decomposed via secondary n-dealkylations generating AA and AC (inset of FIG. 6). After 1.5 hours of irradiation, the concentrations of AA and AC also went down because of the further n-dealkylation of AC probably into thionin (not detected in our measurements). The production of phenothiazine (PH) from deamination of the thionin, could be associated to the peaks observed at 200.0 m/z in the mass spectra (FIG. 5-(b)).

Figure 7:
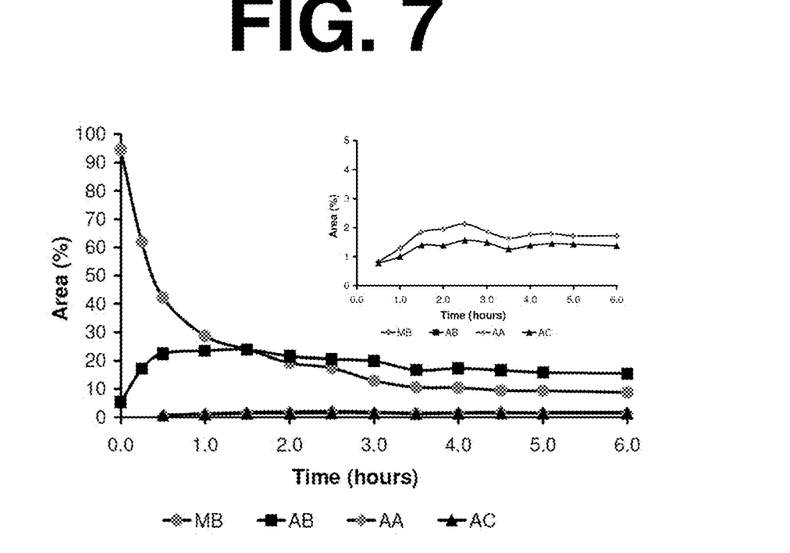
FIG. 7 shows plots for the monitoring of degradation products of Methylene Blue (10 uM) catalyzed by nanocomposite containing a QDs concentration of 160 mg/L according to the present invention.

The MB photodegradation followed a similar route when the magnetic nanocomposites, hosting 160 mg/L of quantum dots were used (FIG. 7); a maximum of 90±1% of MB was photodegraded in this case. The presence of four peaks with the same retention times at 2.5 (AC), 2.7 (AA), 3.5 (AB) and 4.6 (MB) minutes as those observed for the photodegradation of MB alone, (FIG. 5-(a),) would indicate the presence of residual MB co-existing with three photodegradation products (AB, AA and AC). The MS analysis also confirmed the presence of azure A, azure B and azure C in this experiment. The slightly decrease of the photocatalytic activity observed in the nanocomposite (90±1%) in comparison to the quantum dots alone (99.13±0.03%) (FIG. 6) could be due to the decrease of available photo-active sites on the quantum dots surface due to partial coating by magnetite.

In photocatalytic processing, the enhancement on the number of free carriers (electron/holes pairs) on the photocatalyst surface promotes the efficiency of the degradation process. The decrease of the specific surface area of the QDs due to partial coating by magnetite should reduce the availability of free charges in the nanocomposite and thus the photocatalytic activity. Besides, MB molecules could also be adsorbed onto the magnetite surface although at a less extent (a 5% of absorption was observed using pure magnetite; data not shown here); therefore, the presence of magnetite should decrease the efficiency of the photodegradation process and, probably, explain the change of the photodegradation reaction rate from a pseudo-first to a second order relationship (Table 1). Some studies have reported second order kinetic for the photodegradation of MB using nanoparticles. They explained this behaviour based on the aggregation or dimerization of the nanoparticles, which should indirectly increase MB concentration in solution. In our case, the reduction of the QDs active sites by the magnetite coating should be related to the inhibition of the photodegradation process.

Figure 8:
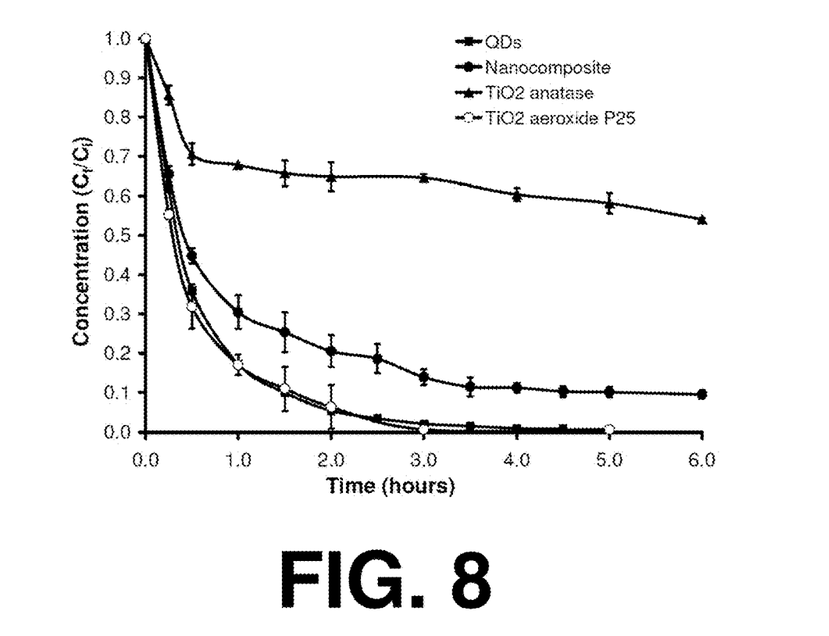
FIG. 8 shows plots for the photodegradation of Methylene Blue (10 uM) using quantum dots, nanocomposite, $TiO_2$ anatase and $TiO_2$ aeroxide P25 according to the present invention.

FIG. 8 shows the degradation of MB under UV irradiation at pH 6.5 in presence of QDs, nanocomposite, $TiO_2$ anatase and $TiO_2$ aeroxide P25. As seen, the degradation efficiency of the MB for the QDs and the nanocomposite was higher than for $TiO_2$ anatase nanoparticles. However, $TiO_2$ aeroxide P25 showed similar degradation efficiency than the QDS and higher efficiency than the nanocomposite. After 4.5 hour of UV-irradiation, the photodegradation was 100% using $TiO_2$ aeroxide P25, almost 100% using 160 mg/L of QDs and 90% using the nanocomposite. Instead, the photodegradation efficiency of MB using $TiO_2$ anatase was 45.9±0.3% after 6 hours of UV-irradiation. These results are in agreement with the low values observed in Table 1 for $TiO_2$ anatase, which indicates that the MB photodegradation is a slow process using this nanomaterial. Previous reports had evidenced that the photodegradation efficiency of $TiO_2$ on organic dyes mainly depends of the $TiO_2$ concentration, irradiation time and UV light intensity. In this way, Mai et al, have reported 40% of photodegradation of Victoria Blue R (VBR) using 100 mg/L of $TiO_2$ (aeroxide P25) after 6.5 hours of 365 nm-UV irradiation using two UV lamps of 15 watts. However, at 1000 mg/L of $TiO_2$, the photodegradation of VBR was almost 100% after 6.5 hours of UV irradiation. Others studies had evidenced an optimum catalyst loading of 1.66 g/L of $TiO_2$ for photocatalytic removal of phenol and 4.0 g/L of $TiO_2$ for degradation of azo dyes. High photodegradation capacities at short irradiation times have been achieved using powerful light radiation sources.

The results showed in FIG. 8 confirm that $TiO_2$ aeroxide P25 have higher photocatalytic capacity than $TiO_2$ anatase. The presence of both anatase and rutile crystallite forms in the $TiO_2$ aeroxide P25 improves the charge separation between the electron-hole pair produced during the excitation process, which should increase the photodegradation of MB. These results suggest that under our conditions, the quantum dots of Cd(Se,S) have similar degradation capacity that $TiO_2$ aeroxide P25. And, the nanocomposite has 10% less degradation capacity than the widely used photocatalytic-agent ($TiO_2$ aeroxide P25).

The adsorption experiments in dark environment showed that 5±1, 8±1, 10±1 and 22±3% of the MB is adsorbed on the surfaces of QDs, nanocomposite, $TiO_2$ anatase and $TiO_2$ aeroxide P25, respectively. As we discussed early, high adsorption of the MB onto the nanoparticles should decreased the photodegradation process when nanoparticles of Cd(Se,S) are used. The nanocomposite adsorbed more MB than the QDs. These results confirmed that MB is adsorbed on the surface of the magnetite (nanocomposite) reducing its photodegradation capacity. For the $TiO_2$ nanoparticles, previous works suggest that the adsorption of the MB onto the $TiO_2$ is necessary to achieve the photodegradation process.

Also, the same degradation products but of low intensities were observed in the chromatograms for the MB photodegradation experiments in presence of both $TiO_2$ nanocrystals, which indicates the same photodegradation mechanism for all these nanomaterials.

Figure 9:
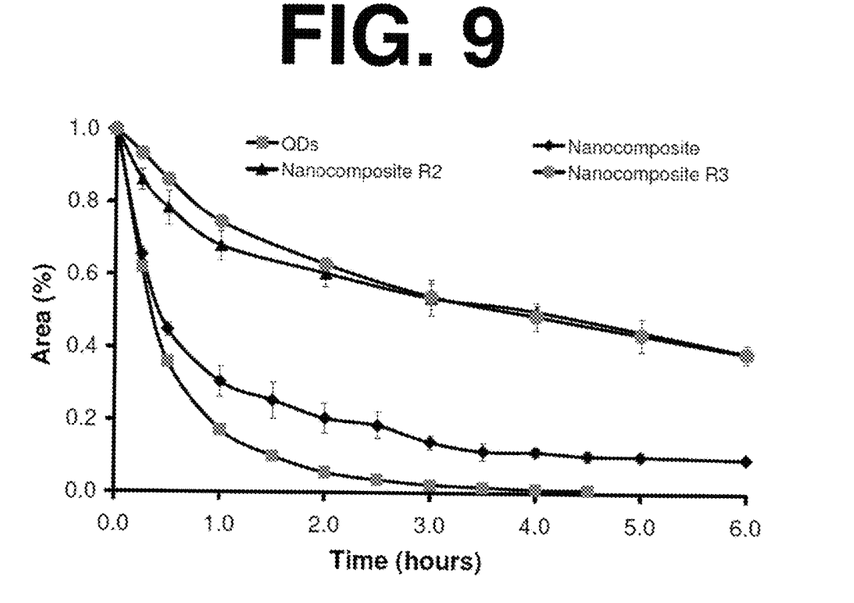
FIG. 9 shows plots for the effect of quantum dots, nanocomposite, nanocomposite at first reuse (R2) and nanocomposite at second reuse (R3); on Methylene Blue (10 uM) photodegradation kinetics according to the present invention.

In order to test that a multifunctional nanocomposite can be used to photodegrade dyes in water, get easily recovered by applying an external magnetic field and reused, the magnetite-QDs nanocomposite was reused twice. After the first and second use, the nanocomposite was magnetically removed from the solution and washed with deionized water. FIG. 9 shows the comparison of the MB photodegradation at pH 6.5, using the QDs alone, the 'fresh' nanocomposite and the reused nanocomposites. The corresponding photodegradation efficiencies were 99.11±0.03%, 90±1, 62±1% and 65±5%, respectively.

The MB photodegradation by reused nanocomposites followed a second order kinetic (Table 1) as previously observed for the 'fresh' nanocomposite. The MB photodegradation efficiency decreased after the first reuse; however it remained almost constant at 65% after the second reuse. A 15% of the initial weight was lost during the washing of the magnetically recovered nanocomposite, which could explain the decrease in the photodegradation efficiency. These results suggest that the nanocomposites with low magnetic properties are lost after the first use. Apparently, only nanocomposites with good magnetic properties are recovered during the recycling processes and this support the similar photodegradation capacity of the nanocomposites after the first and second reuse. A pre-selection of nanocomposites with high magnetic capacity is strongly recommended to avoid the lost of nanocomposite during the reuses. The QDs and nanocomposites based in cadmium have high potential use in photodegradation processes; however, it is necessary to study their water stability under light excitation for long period of time in order to assure the absence of leaching of cadmium ions.

Conclusion

Fluorescent-magnetic nanocomposite synthesized using Cd (Se,S) QDs and $Fe_3O_4$ were successfully produced via a ligand-exchange method. The as-prepared nanocomposite retains the fluorescent and magnetic properties of each phase. Under the used-conditions, the nanocomposite has 10% less photodegradation capacity than $TiO_2$ aeroxide P25 nanoparticles. The degradation of MB was 99.11%, 90%, 100% and 45.9% using QDs, bi-functional nanocomposites, $TiO_2$ aeroxide P25 and $TiO_2$ anatase, respectively. Reused nanocomposites showed a photodegradation activity not less than 62%, which is higher than the $TiO_2$ photodegradation capacity. The loss in the weight of the nanocomposite after washing could be related to this decrease in efficiency. It is also envisioned that any quantum dots with photo-catalytic capacity and any kind of nanometric magnetic material can be used to synthesize the nanocomposite. Also, any contact time can be used during the functionalization process. The photodegradation products were analyzed by Mass Spectrometry showing that MB suffered a demethylation to form azure B which suffers secondary n-dealkylations to produce azure A and azure C as intermediate products.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method of synthesizing fluorescent-magnetic nanocomposite material to degrade organic dyes in aqueous phase comprising:

combining Cd(Se,S) quantum dots and magnetite via ligand-exchange by contacting meso-2,3-Dimercaptosuccinic Acid (DMSA)-magnetite nanoparticles with a glutaraldehyde solution; and suspending functionalized magnetite nanocrystals from the resulting mixture in the presence of Cd(Se,S) quantum dots.

2. The method of claim 1, wherein said DMSA-magnetite nanoparticles are prepared by:

heating a sodium hydroxide solution;

adding an iron solution;

adding a sodium oleate solution to produce oleate-coated magnetite nanoparticles;

adding to the oleate-coated magnetite nanoparticles a solution of DMSA in dimethyl sulfoxide to promote the ligand exchange and replace the oleate for the DMSA species; and recovering said DMSA-magnetite nanoparticles.

3. The method of claim 1, wherein said Cd(Se,S) quantum dots are prepared by adding a selenide solution to a cadmium sulfate solution in the presence of thioglycolic acid (TGA).

4. The method of claim 1, wherein said suspended DMSA-magnetite nanoparticles is contacted with a 3% v/v of said glutaraldehyde solution to a final concentration of 5000 mg/L and stirred for 18 hours at room temperature.

5. The method of claim 1, wherein the functionalized magnetite nanocrystals are recovered magnetically.

6. The method of claim 1, wherein the recovered functionalized magnetite nanocrystals are suspended in phosphate buffered saline (PBS) in the presence of 300 mg/L of Cd(Se,S) quantum dots and stirred for 18 hours at room temperature.

7. The method of claim 1, further comprising magnetically recovering a resulting fluorescent-magnetic nanocomposite.

8. The method of claim 2, wherein said sodium hydroxide solution is stirred at 500 rpm.

9. The method of claim 2, wherein 0.06 M of said sodium oleate solution is added after one hour of reaction time and stirred for one hour.

10. The method of claim 2, wherein the oleate-coated magnetite nanoparticles are washed with deionized water, ethanol and acetone and ultrasonicated for 10 minutes in the presence of toluene.

11. The method of claim 2, wherein 0.55M of the solution of DMSA in dimethyl sulfoxide is added and ultrasonicated for one hour.

12. The method of claim 2, wherein an excess of organic phase is removed prior to recovering said DMSA-magnetite nanoparticles.

13. The method of claim 3, wherein said selenide solution is added to said cadmium sulfate solution at a pH of 7.0.

14. The method of claim 3, wherein the molar ratio of Cd/TGA/Se is fixed at 1/4.8/0.04.

15. The method of claim 3, wherein the solutions are heated for 30 minutes at 140° C.

* * * * *